Oct. 12, 1926. 1,603,137
F. W. MEYER

CONTROLLING APPARATUS AND SYSTEM

Filed April 29, 1920 2 Sheets-Sheet 1

Inventor
Friedrich W. Meyer
Edwin B. H. Tower Jr. Atty.

Oct. 12, 1926.

F. W. MEYER 1,603,137

CONTROLLING APPARATUS AND SYSTEM

Filed April 29, 1920    2 Sheets-Sheet 2

Inventor
Friedrich W. Meyer
Edwin B. H. Tower Jr. Atty.

Patented Oct. 12, 1926.

1,603,137.

UNITED STATES PATENT OFFICE.

FRIEDRICH WILHELM MEYER, OF BRUNSWICK, GERMANY, ASSIGNOR TO THE CUTLER-HAMMER MFG. CO., OF MILWAUKEE, WISCONSIN, A CORPORATION OF WISCONSIN.

CONTROLLING APPARATUS AND SYSTEM.

Application filed April 29, 1920. Serial No. 377,568.

This invention relates to controlling apparatus and systems.

It is particularly applicable to the regulation and control of dynamo electric machines although not limited to such use.

Dynamo electric and other machines deriving their power from alternating current sources of distribution may be regulated for varying load and power conditions by electronic valves, as shown in my Patent No. 1,353,815, granted Sept. 21, 1920. Such valves are regulated by varying the magnitude of controlling potentials therefor, in accordance with the varying operating conditions to which the machines are subject.

Systems employing such electronic valves have the advantage of applying the regulating effect substantially coincidently with the varying operating conditions, for no independently moving masses or self-induction comes into play. Only under certain conditions, such, for example, as with very slow speed direct current and induction motors, certain difficulties may be experienced in the use of merely potential variation control. A cause for these difficulties may be that, because the current delivered to the motor may take the form of sudden heavy impulses, the power of subsequent impulses may be excessively diminished. This may occur even though the speed of the motor may be fairly constant for a constant load. The presence of such sudden heavy impulses is explained by the fact that under such circumstances a large difference exists between the line voltage and the counter electromotive force. However, the electronic regulator is only affected by speed changes, and consequently if it allows an impulse to be ignited it may not be able to cut off the impulse before the same ends naturally. This is especially true if the load is heavy and the current impulses, after being started, need no support by auxiliary discharges to be maintained. These sudden impulses may become so heavy that one is sufficient for quite a while to take care of the load on the motor, and consequently only an occasional heavy impulse of current will be delivered to the motor. Such distribution of current impulses delivered to the motor tends to vary the speed of the motor and is therefore undesirable. If no means are employed for limiting the current impulses the distribution systems are also subjected to sudden, heavy and intermittent drains in addition to the fact that the closest of regulation and stabilization may not be obtained.

One of the objects of this invention is to improve the regulation and stabilization of dynamo electric machines.

Another object is to supplement pure voltage regulation of electronic valves by limiting the periods during which the ignition of impulses is possible.

Another object is to increase the accuracy of the regulator for the varying conditions to which a machine may be subjected.

Another object is to equalize the drain upon power distribution lines and machines fed therefrom.

Another object is to provide a system in which the regulation and control is effected by electrically varying both the duration and the magnitude of controlling potentials.

Another object is to equalize the power of different impulses by determining through shifting of the phase of the controlling potentials the period when the ignition of an impulse is possible and then determine the time of ignition by the magnitude of the controlling potentials.

Other objects and advantages will appear from the specification and claims.

For the purpose of illustration embodiments of the invention, as applied to both alternating and direct current motors, are diagrammatically shown in the accompanying drawings.

Figure 1:
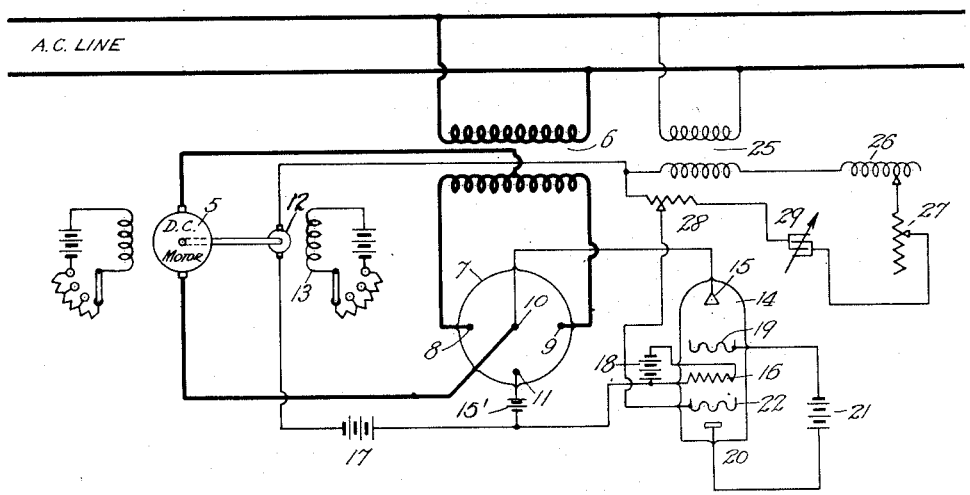
Figure 1 shows a direct current motor operated from an alternating current line, the control of the motor being affected by both shifting the possible ignition period and altering the magnitude of controlling potentials.

Fig. 1 will first be described.

A direct current motor 5 having a separately excited field is driven by current from an alternating current line. The motor is regulated for variations in operating conditions such as load, line voltage, etc., by controlling the load current thereto. Motor 5 receives unidirectional current pulsations from the line through a transformer 6 and an electronic rectifier valve 7. Rectifier valve 7 may be of the arc discharge type and the motor is regulated and controlled by varying the discharge therein.

Electronic rectifier valve 7 has a pair of main anodes 8 and 9 connected to the opposite ends of the secondary winding of transformer 6. There is also a common cathode 10. The opposite brushes of motor 5 are connected respectively to the middle of the secondary winding of transformer 6 and cathode 10. The discharges in valve 7 are controlled by an auxiliary or ignition electrode 11.

The potential impressed upon ignition electrode 11 is regulated by the variations in operating conditions to which the motor is subjected.

A small direct current generator or tachometer machine 12, having an adjustable separately excited field 13 is connected directly to the motor so as to simulate the operation thereof. The voltage of the tachometer, which varies directly with the speed of the motor, influences the discharge in an electronic relay 14.

Relay 14 has a main anode 15, connected to the common cathode 10 of valve 7. There is also a cathode 16 which is connected through battery 18 to ignition electrode 11 of rectifier valve 7. Cathode 16 is connected to one of the brushes of tachometer 12 through a battery 17. The voltages of battery 17 and tachometer 12 oppose each other, and the battery voltage may normally predominate slightly, and the voltage difference maintains a potential charge on grid 22. Cathode 16 is heated by current from a battery 18.

Relay 14 has an auxiliary electrode 19, which may take the form of a grid interposed between anode 15 and cathode 16. Electrode 19 is connected to an electrode 20 through a battery 21. The electrode 22, which may take the form of a grid, is interposed between cathode 16 and anode 20.

The action in relay 14 is such that the potential on grid 22 influences the discharge between cathode 16 and electrode 20, thus controlling the potential on grid 19. Grid 19 controls the discharge between cathode 16 and anode 15. The effects of the grids are multiplied within the vessel so that small changes in the potential on grid 22 result in comparatively great changes in the discharge between cathode 16 and anode 15. The changes in the discharge between cathode 16 and anode 15 cause corresponding changes in the ignition potential impressed on the ignition electrode 11. The operation of valves or relays of this character is set forth in my Patent No. 1,369,457, granted Feb. 22, 1921.

Relay 14 may, if desired, be replaced by a relay of the ordinary type, having a heated cathode, an anode and one grid or auxiliary anode if it is not desirable or necessary that a highly magnified controlling and regulating effect be utilized.

The ignition potential on ignition electrode 11 of rectifier valve 7 is controlled by an alternating voltage wave or potential superimposed upon the difference between the tachometer and battery voltages. This superimposed alternating voltage wave determines the period of the line voltage wave during which the ignition of the current impulse is possible. By changing the phase of this superimposed wave with respect to the line voltage wave the period during which ignition is possible may be varied.

Regulation is automatically provided for variations in the operating conditions of the motor by automatically varying the magnitude of the controlling potential impulses on ignition electrode 11. The potential impulses may also be controlled by altering the position or phase displacement between the power impulses from the line and the alternating voltage which is superimposed upon the difference between the battery and tachometer voltages, thereby limiting the period during which the ignition of the power impulses is possible.

The alternating voltage is derived by induction from the line through a transformer 25 and is controlled at will as to magnitude, character and phase relation relative to the line current by an adjustable network of resistance, inductance and capacity.

The secondary winding of transformer 25 is included in series with the adjustable net work comprising a variable inductance 26, variable resistances 27 and 28 and variable capacity 29. Resistance 28 serves as a potentiometer which determines what proportion of the net work voltage is impressed upon the control or sensitive circuit of relay 14 and superimposed upon the difference between the battery and tachometer voltages. One side of this network is connected in circuit between grid 22 and one of the brushes of tachometer 12. By changing the inductance and capacity of the network the phase relation between the line impulses impressed between anode 16 and cathodes 8 and 9 and potential impulses impressed on grid 22 of relay 14 may be varied. Thus the effect of the variations in the difference between tachometer and battery voltages is under normal control and may be changed to suit the conditions. If it is found that with a given phase relation or setting of the variables of the network the power impulses from the line are too pronounced, resulting in the elimination of too many unidirectional pulsations to the motor and increasing the magnitude of the impulses supplied, and a consequent unequal drain or unbalance and tendency to destabilization, the condition can be improved by shifting the position or phase relation of the waves or pulses affecting relay 14.

Thus the variables of the network are adjusted so that, for substantially constant speed of the motor for a given load, each somewhat diminished power impulse from the line delivers practically the same operating current to the motor. This varying of the setting of the network, changes the phase relation between the superimposed alternating potential waves on the grid of relay 14 and the line voltage waves. Thus the portion of the line voltage waves during which it is impossible to ignite a current impulse is lengthened or shortened. Consequently the length of period during which it is possible for an arc to be ignited is determined. The difference between the voltage of the tachometer 12 and the battery 17 not only determines the ignition point during this period but also influences slightly the period during which the ignition of a power impulse is possible. For example, if this difference is great, the grid potential is correspondingly higher. Consequently the beginning of the period during which the ignition of a power impulse is possible may be advanced slightly.

Manifestly during the one half wave of each alternating potential cycle impressed on the grid of the relay 14 it will be impossible to ignite an arc in the device 7, for during this half wave the wave voltage opposes the difference in voltage between the tachometer and battery 17.

If, with the proper setting of the network, the speed of the motor tends to decrease, this decrease is simultaneously communicated to the tachometer whose voltage is lowered. The difference between the voltage of tachometer 12 and battery 17 increases and a greater potential is impressed on grid 22 of relay 14. The increase in grid potential in relay 14 is greatly and instantaneously magnified within relay 14 resulting in a greatly increased discharge therethrough and a consequent great increase in the ignition potential on ignition electrode 11 of the rectifier valve 7. Rectifier valve 7 instantly provides, during the predetermined period, ignition at a certain point on the corresponding half wave of load current, if ignition takes place at all. Therefore a current impulse is delivered to motor 5 with the proper corrective effect substantially coincidently with the initiation of the need for correction.

If the motor increases in speed the tachometer likewise increases and the voltage generated thereby increases. The difference between the voltage of the tachometer 12 and battery 17 decreases and a decreased potential is impressed on grid 22 of relay 14. Consequently the ignition potential impressed on ignition electrode 11 of rectifier valve 7 is greatly decreased. Rectifier valve 7 instantly provides, during the predetermined period, ignition on the corresponding half wave of load current at such a point that less current will be delivered to motor 5 with the proper corrective effect substantially coincidently with the initiation of the need for correction. The distribution of the impulses is not influenced.

Figure 2:
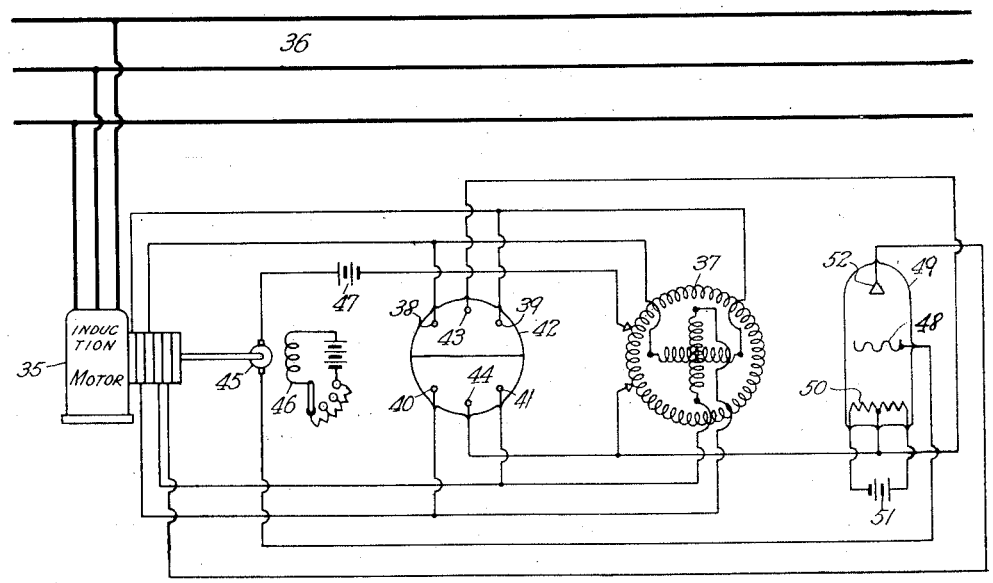
Fig. 2 shows an induction motor associated with a modified regulator and automatically regulated by altering the magnitude of controlling potentials.

Fig. 2 shows a regulating and controlling system for induction motors wherein the forming of the waves of controlling potentials for controlling the periods during which the ignition of power impulses is possible is under the favorable influence of the speed of the motor, since for lower speeds the corrective waves are larger.

An induction motor 35 derives its load current from a three phase line 36. The speed of the motor is regulated for variations in load, line voltage, etc., by controlling the load current or more exactly its effective voltage through the regulation of the current induced in its secondary.

The motor has a two phase secondary which is connected to the primary windings of a phase transformer or convertor 37 and the main electrodes 38 and 39, and 40 and 41 respectively by an electronic valve 42. Valve 42 may be of the arc discharge type and has ignition electrodes 43 and 44 associated with the respective pairs of main electrodes 38 and 39 and 40 and 41. The vessel of valve 42 may be divided into two compartments to prevent interference between discharges. The electrodes of each pair 38 and 39, and 40 and 41 act alternately as anode and cathode and the discharge therebetween controls the motor secondary current and hence the motor load current.

A direct current tachometer 45, having an adjustable separately excited field 46 is connected to the rotor of motor 35 so as to simulate the operation thereof. The brushes of tachometer 45 are respectively connected to an adjustable point on the secondary winding of phase transformer 37 through a battery 47 and to an auxiliary anode 48 of an electronic relay 49. The voltages of tachometer 45 and battery 47 oppose each other, and the battery voltage may normally predominate.

Relay 49 is also provided with a cathode 50 connected in parallel to an adjustable point on the secondary of transformer 37 and ignition electrodes 43 and 44 of device 42, cathode 50 is heated by current from a battery 51. The relay has a main anode 52 connected to the motor secondary.

The ignition potentials on ignition electrodes 43 and 44 are induced waves passing through and controlled by relay 49 superimposed upon the direct current in the sensitive circuit, which is dependent upon the difference between the voltages of tachometer 45 and battery 47.

The induction motor is automatically regulated for variations in operating conditions thereof by automatically varying the magnitude of the controlling potential impulses on the ignition electrodes 43 and 44. The potential impulses may also be controlled by altering the position or phase displacement between the impulses of the secondary circuit and the alternating voltage induced through the phase transformer 37 and superimposed upon the difference between the battery and tachometer voltages. Thus the periods during which the ignition of the secondary impulses is possible are limited, especially as not to allow big impulses for low speed.

The phase displacement is varied by changing the points of connection of the motor secondary circuit to the phase transformer 37. The voltage of the secondary circuit of the motor depends upon the speed of the motor. Consequently changes in motor speed have a favorable effect upon the magnitude of the superimposed potentials, because with lower speeds the secondary voltage is higher. Thus the possible point of ignition is determined by resultant voltage of the difference between the battery and the tachometer voltage and the superimposed potentials.

Changes in the speed of motor 35 brought about by variations in load, line voltage, etc. substantially coincidently cause changes in the direct current voltage of the sensitive circuit because of the changes in tachometer voltage. The voltage of the motor secondary depends upon the speed of the motor. Therefore motor speed changes substantially coincidentally bring about a change in magnitude of the superimposed potentials induced from the motor secondary through the phase transformer into the sensitive circuit. Consequently the magnitude of the alternating waves acting upon ignition electrodes 43 and 44 will be dependent upon the speed of the motor. Thus the time during which ignition of the current impulses is possible will be advanced or retarded in accordance with speed changes of the motor. Thus the variations in amplitude of the ignition waves or impulses on valve 42 provide a certain corrective force which is applied to the motor substantially coincidently with the requirements for correction. Thus the corrective impulses in the motor secondary and consequently in the motor primary and from the distribution line may be made very regular, and close regulation and stable operation will result.

Figure 3:
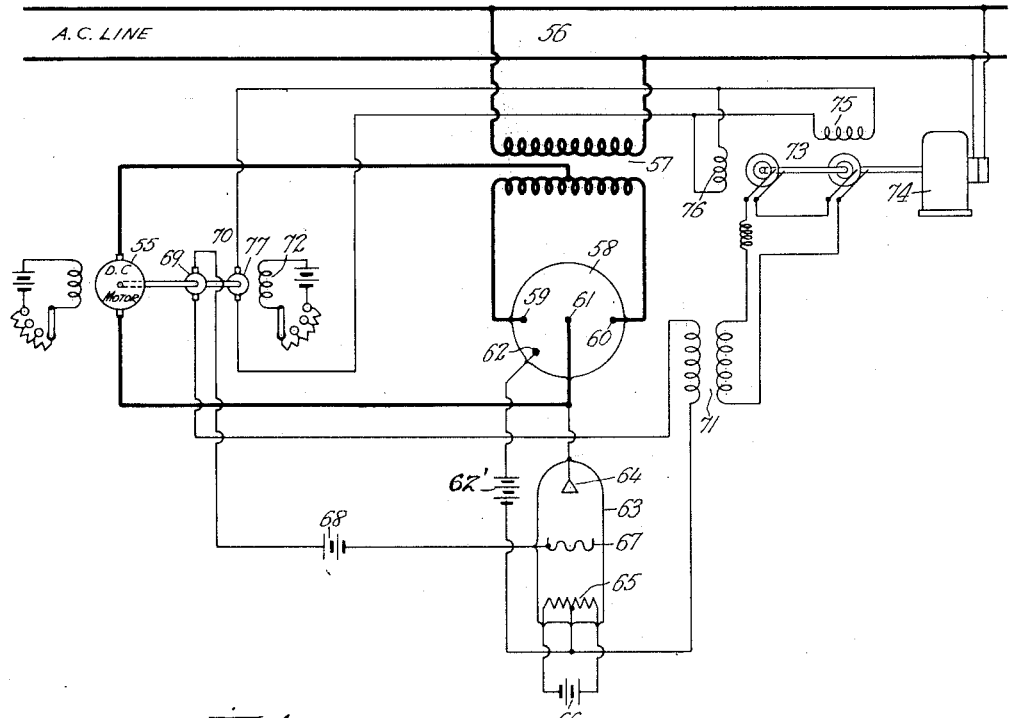
Fig. 3 shows a direct current motor regulated by another form of regulator.

Fig. 3 shows a direct current motor driven by power impulses from an alternating current line and regulated for variations in load, line voltage, etc., by changing both the amplitude and position or phase relations of the controlling impulses in the sensitive circuit.

A direct current motor 55 of the separately excited field type is driven by unidirectional impulses derived from line 56 through the action of a transformer 57 and an electronic valve 58.

Valve 58 may be of the arc discharge type having two main anodes 59 and 60, a cathode 61 and an auxiliary or igniton electrode 62. The motor armature, transformer and electronic valve are connected together and the motor is regulated by varying the discharge as previously described.

An electronic relay 63 controls the potential between ignition electrode 62 and cathode 61 and thus controls the time of ignition in valve 58 and the amount of current delivered to motor 55. Relay 63 has a main anode 64 and a cathode 65 heated by current from a battery 66. The relay also has an auxiliary anode 67, which may take the form of a grid.

Cathode 61 and ignition electrode 62 of valve 58 are connected respectively to anode 64 and cathode 65 of relay 63, battery 62' being interposed between cathode 65 and the ignition electrode 62. The sensitive or controlling circuit is connected to cathode 65 and grid 67 of relay 63. This circuit includes a battery 68, one of the armatures 69 of a small tachometer machine 70 and the secondary winding of a transformer 71. Tachometer 70 has an adjustable separately excited field 72 and its armature 69 and battery 68 are so connected in circuit that their voltages oppose. Normally the battery voltage may predominate slightly.

Tachometer 70 is directly connected to motor 55 to be driven thereby and simulate the operation thereof.

The adjustable primary winding of transformer 71 is connected in a circuit including the rotors of a pair of small alternating current generators 73. The windings of generator 73 are of different phases so that the resultant effect on transformer 71 is the combination of their outputs. This resultant may be varied as to phase or position by changing the relative values of the voltages produced by generators 73.

Generators 73 are driven at relatively constant speed by a small synchronous motor 74 driven from line 56. The relative values of the voltages produced by generator 73 are varied by varying their relative excitation. Generators 73 are provided with separate fields 75 and 76 connected in parallel and in the reverse direction in a circuit including a second armature 77 of tachometer 70.

The effective or controlling voltage between grid 67 and cathode 65 of relay 63 is the voltage induced in the sensitive circuit by transformer 71, from the resultant of the voltages of generators 73, superimposed upon the direct current voltage represented by the difference between the voltages of battery 68 and armature 69 of tachometer 70.

The changing of the phase relation between the superimposed alternating potential waves on the grid of relay 63 and the line voltage waves may be accomplished by varying the adjustment of the primary winding of transformer 71. The adjustment is such that for substantially constant speed of the motor for a given load each power impulse from the line delivers practically the same operating current to the motor.

The excitation of the generators 73 is dependent upon the speed of the motor. Consequently when the speed of the motor changes the excitation of one of the generators is increased and that of the other is decreased. Therefore the phase of the amplitude resultant of the generators is dependent upon the speed of the motor which accordingly changes the phase relation between the superimposed alternating potential on the grid of relay 63 and the line voltage waves. Consequently a change in motor speed serves to increase or decrease the period of the line voltage wave when the ignition of a current impulse is possible, so as not to allow big impulses at low speeds.

Changes in the speed of motor 55 brought about by variation in load, line voltage or other operating conditions varies the direct current voltage upon which the waves or impulses produced through transformer 71 are superimposed. The changes in motor speed also vary the relative excitation of generators 73, changing or shifting the resultant and consequently the superimposing impulses induced in the sensitive circuit through transformer 71.

Thus the motor is automatically controlled for changes in operating conditions by varying both the effective amplitude and the position of regulative pulses in the sensitive circuit.

Figure 4:
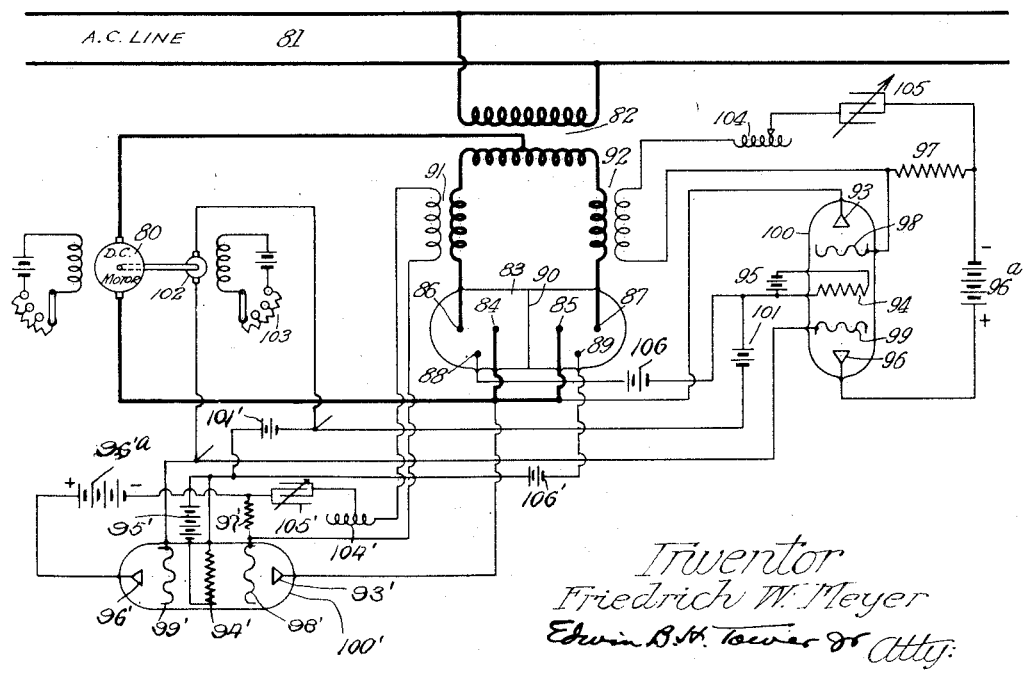
Fig. 4 shows a direct current motor operated from an alternating current line, the control of the motor being effected electronically and the half waves of each cycle of current being balanced against each other.

Figure 4 shows a direct current motor driven by power impulses from an alternating current line and regulated for variations in load, line voltage, etc., whereby the two half waves of a cycle of alternating current are balanced.

A direct current motor 80 of the separately excited field type is driven by unidirectional impulses derived from line 81 through the action of a transformer 82 and an electronic valve 83.

Valve 83 may be of the arc discharge type having two cathodes 84 and 85, two main anodes 86 and 87 and two auxiliary or ignition electrodes 88 and 89. A separating grid or wall 90 within the valve 83 separates the two electrode systems. The cathodes 84 and 85 are connected in parallel and to one brush of the motor armature, the other brush is connected to the middle point of the secondary of the transformer 82. The ends of the secondary of the transformer 82 are connected through the primaries of transformers 91 and 92 to the respective main anodes 86 and 87 of the valve 83.

An electronic relay 100 of the self-intensifying type disclosed in my Patent No. 1,369,457 granted Feb. 22, 1921, controls the potentials between the starting or ignition electrode 88 and the cathode 84 and thus controls the ignition in the arc discharge valve 83 and consequently the instantaneous amount of current delivered to the motor 80. Relay 100 has a main anode 93 and a cathode 94 heated by current from a battery 95. The relay also has an auxiliary anode 96 connected through a battery 96ª and a resistance 97 to a supplemental anode 98 which may take the form of a grid. The potential of the grid 98 controls the discharge between the cathode 94 and the main anode 93, The relay contains another supplemental anode 99 which may also take the form of a grid and which controls the discharge between the cathode 94 and the auxiliary anode 96.

Cathodes 84 and 85 and the ignition electrode 88 of the valve 83 may be connected respectively to the anode 93 and one end of the cathode 94 of the relay 100, a battery 106 being interposed between the cathode 94 and the ignition electrode 88. The sensitive or controlling circuit is connected to cathode 94 and grid 99 of the relay 100. This sensitive or control circuit includes a battery 101 and the armature of a small tachometer machine 102. The tachometer 102 has an adjustable separately excited field 103, and its armature and the battery 101 are so connected in circuit that their voltages oppose, normally the battery voltage may predominate slightly.

Tachometer 102 is directly connected to the shaft of the motor 80 to be driven thereby and simulate the operation thereof.

The secondary winding of the transformer 92 is connected in circuit with an adjustable inductance 104 and an adjustable capacity 105 and across the terminals of resistance 97. One half wave passing through the primary of the transformer 92 induces a voltage into the secondary thereof which is impressed across the terminals of the resistance 97. Consequently this induced alternating voltage is superimposed upon the auxiliary sensitive circuit of the relay 100, and is impressed upon the grid 98 thereof.

The second relay 100′ similar to relay 100 may be associated with the tachometer and the arc discharge valve 83 for cooperating with the other half wave of line current through the valve 83. The main anode 93′ of relay 100′ may also be connected with the cathodes 84 and 85 of the valve 83, and the cathode 94′ to the starting or igniting electrode 89. The sensitive circuit may also be connected to the cathode 94′ and grid 99′.

The relay 100′ may also be associated with the secondary of the transformer 91 through an adjustable inductance 104′ and adjustable capacity 105′ and a resistance 97′ similar to those associated with relay 100.

It is well known that it is practically impossible on account of the falling characteristics of the arc to construct arc discharge rectifier valves, so that each side thereof will take the same amount of current. Consequently the two half waves passing through such valves will be unbalanced; that is, one half wave may be delivering considerable more current than the other. This results in the uneven distribution of current to the motor and is very undesirable.

The arrangement of Fig. 4 is employed to balance the two half waves of each cycle which pass through the rectifier valve 83 over different paths. This balancing of the two half waves of each cycle is accomplished by limiting the period of each half wave during which ignition of the current impulses is possible. This limiting of such periods is brought about by influences from the large half wave to the smaller, assuming that one half wave is delivering more current than the other.

As in the former described arrangements, an alternating potential superimposed upon the direct current of a sensitive circuit connected to an electronic relay is employed to limit the period during which the ignition of a current impulse in possible. The phase relation between this superimposed alternating potential and the line voltage determines the period. This phase relation may be changed by varying the amount of induction and capacity in circuit with the secondaries of the transformers 91 and 92. The adjustment of these inductances and capacities is such that for a constant speed of the motor for a given load each half wave from the line through the valve 83 delivers practically the same operating current to the motor, an influence from one half wave upon the other being provided through the transformers 91 and 92 for balancing one half wave against the other.

The magnitude of the potentials impressed upon the grid 98 of the relay 100 and the similar grid 98′ of the second relay 100′ determines the magnitude of the alternating waves acting upon the ignition electrodes 88 and 98 and consequently determine the point of ignition within the permissible period determined by the setting of the adjustable inductances and capacities, and the effect of the voltage induced through transformer 92. The magnitude of these grid potentials is determined solely by the speed of the motor and the repartition of the load, when the line voltage remains constant.

It is supposed that sufficient sensitiveness is obtained by superimposing the alternating potential influence directly upon the circuit connected to the grid 98. Greater sensitiveness may be obtained by superimposing this alternating potential influence upon the sensitive circuit connected to the grid 99. The resistance 97 would then be connected in such sensitive circuit instead of being in the circuit connected to the grid 98.

What is claimed is:

1. A controlling system comprising a machine to be controlled, a main controlling circuit therefor, a sensitive circuit traversed by current impulses which control the action of the main circuit, and means associated with the sensitive circuit for shifting the phase of the impulses therein to vary the effect of the sensitive circuit upon the main controlling circuit.

2. A controlling system comprising a machine to be controlled, a main controlling circuit therefor, a sensitive circuit traversed by current impulses which control the effect of the main circuit upon said machine, and means for advancing and retarding the impulses in the sensitive circuit for changing the effect thereof upon the main controlling circuit.

3. A controlling and regulating system having a machine to be regulated for variations in load and power conditions, a main controlling circuit therefor, a sensitive circuit in which flow current impulses controlling the effect of said main circuit, and means associated with the sensitive circuit and responsive to said varying conditions for advancing and retarding the impulses in the sensitive circuit and changing the effect thereof upon the main circuit.

4. A controlling and regulating system for dynamo electric machines having in combination a dynamo electric machine subject to varying load and power conditions, a main controlling circuit providing current for said machine to control the same, a sensitive circuit cooperating with said main controlling circuit and traversed by current impulses acting to vary the current provided thereby to said machine, and means responsive to the varying conditions to which said machine is subject and acting to shift the impulse in the sensitive circuit to vary the effect thereof upon the main controlling circuit.

5. A regulating system for a dynamo electric machine subject to varying load and power conditions comprising an electronic relay to be associated with the machine to control the same, a sensitive circuit associated with said relay and controlling the operation thereof, means for supplying said sensitive circuit with a direct current, means for supplying said sensitive circuit with alternating current which is superimposed upon the direct current thereon, the effect of the sensitive current upon said relay being dependent upon both the magnitude of the direct current and the position of the alternating current waves, and means for shifting the position of the alternating current waves in the sensitive circuit.

6. A controller for a dynamo electric machine operated by current from an alternating current source, comprising an electronic arc discharge valve through which current is supplied, an electronic relay controlling the ignition of an arc in said valve, and means for electrically determining the period in each half wave during which the ignition of an arc is possible.

7. A controlling system comprising a dynamo electric machine to be controlled, a work circuit therefor, an arc discharge valve in the work circuit traversed by alternating current, an electronic relay controlling the ignition of an arc in the valve, and means for electrically determining the period in each half wave during which the ignition of an arc is possible.

8. A controlling and regulating system for a dynamo electric machine to be regulated for variations in load and power conditions, a work circuit therefor, an arc discharge valve in the work circuit traversed by the alternating current, an electronic relay controlling the ignition of an arc in the valve, and means responsive to the varying conditions and electrically determining the period in each half wave during which ignition of an arc is possible.

9. A controlling and regulating system having a dynamo electric machine to be regulated for variations in load and power conditions, a work circuit therefor, an arc discharge valve in the work circuit traversed by alternating current, an electronic relay controlling the ignition of an arc in the valve, means for electrically determining the period in each half wave during which the ignition of an arc is possible, and means simultaneously responsive to the varying conditions and impressing upon the relay an electromotive force which controls the arc ignition potential.

10. A controlling system comprising a machine to be controlled, a main controlling circuit therefor, an electronic relay for controlling the main circuit, a sensitive circuit for the electronic relay, inductive means for delivering to the sensitive circuit current impulses which control the effect of the relay upon the main circuit, and means for advancing and retarding the impulses in the sensitive circuit thereby to change the effect thereof upon the main circuit.

11. A controlling and regulating system for a machine to be regulated for variations in load and power conditions, a main controlling circuit therefor traversed by current impulses, a sensitive circuit in which flow current impulses controlling the main circuit current impulses, an electronic relay interlinking the main and sensitive circuits whereby the sensitive circuit impulses produce magnified effects upon the main circuit impulses, means simulating the operation of the machine to be regulated and impressing corrective influences upon the sensitive circuit, and electrical means associated with the sensitive circuit and responsive to the varying conditions and cooperating with the first mentioned means for advancing and retarding the sensitive circuit current impulses to control the number, duration and magnitude of the main circuit current impulses.

12. A controlling and regulating system having a dynamo electric machine to be regulated for variations in load and power conditions, a main controlling circuit therefor including an electronic arc discharge valve through which pass current impulses, an ignition electrode for the valve, an electronic relay controlling the potential of the ignition electrode to ignite an arc in the valve, a controlling circuit for the relay, means responsive to the varying conditions and impressing upon the controlling circuit an electromotive force varying with such conditions, and means responsive to the varying conditions and impressing upon the sensitive circuit an alternating electromotive force which determines the period in each main circuit impulse during which the ignition of an arc is possible, the point of ignition being determined by the first mentioned electromotive force.

13. A controlling and regulating system for dynamo electric machine to be operated by current derived from an alternating current source and to be regulated for variations in load and power conditions, comprising an electronic arc discharge valve in the load circuit of the machine, an electronic relay, a sensitive circuit associated with the relay and controlling the operation thereof, means including a machine simulating the operation of the machine to be regulated and impressed upon the sensitive circuit a direct current voltage changing with the varying conditions, means for impressing upon the sensitive circuit an alternating current voltage superimposed upon the direct current voltage, and an ignition electrode for the valve whose potential is controlled by the relay, the period in each half wave during which the ignition of an arc is possible being determined by the effect of the alternating current voltage superimposed upon the direct current voltage and the point of ignition being determined by the combined effects of the alternating and direct current voltages.

14. A controlling system for a dynamo electric machine comprising a main controlling circuit therefor, an arc discharge valve in the main circuit traversed by current impulses, an auxiliary controlling circuit for the valve controlling the ignition of an arc therein, and means for impressing upon the auxiliary controlling circuit direct current potentials upon which are superimposed alternating current potentials for controlling the period in the voltage waves during which the ignition of an arc is possible.

15. A controlling system for a dynamo electric machine comprising a main controlling circuit therefor, an arc discharge valve in the main circuit traversed by current impulses, an auxiliary controlling circuit for the valve controlling the ignition of an arc therein, and means for impressing upon the auxiliary controlling circuit direct current potentials upon which are superimposed alternating current potentials for controlling the period in the voltage waves during which the ignition of an arc is possible, the point of ignition being determined by the direct current potentials.

16. A controlling system for a dynamo electric machine comprising a main controlling circuit therefor, an arc discharge valve in the main circuit traversed by current impulses, an auxiliary controlling circuit for the valve controlling the ignition of an arc therein, and means for impressing upon the auxiliary controlling circuit direct current potentials upon which are superimposed alternating current potentials for controlling the period in the voltage waves during which the ignition of an arc is possible, the point of ignition being determined by the combined action of the alternating and direct current potentials.

In witness whereof, I have hereunto subscribed my name.

FRIEDRICH WILHELM MEYER.

CERTIFICATE OF CORRECTION.

Patent 1,603,137,     granted October 12, 1926.

to FRIEDRICH WILHELM MEYER.

It is hereby certified that error appears in the printed specification of the above mentioned patent requiring correction as follows: Page 1, lines 9, 10, 16, 37, 63, page 2, lines 7, 11, and 32, page 3, lines 99, and 119, page 4, lines 78, 83, 86, page 5, lines 66 and 67, and 82, page 6, line 47, page 7, line 6, claim 5, lines 23 and 25, claim 6, line 34, claim 7, line 44, claim 8, line 55, claim 9, lines 66 and 68, claim 10, line 81, claim 11, lines 99 and 101, claim 12, lines 121 and 122, claim 13, for the word "electronic" read "electroionic"; page 1, lines 105 and 106, for the word "electronically" read "electroionically"; page 4, line 22, for "speed" read "speeds"; page 7, line 127, claim 13, for the word "impressed" read "impressing"; and that the said Letters Patent should be read with these corrections therein that the same may conform to the record of the case in the Patent Office.
Signed and sealed this 22nd day of February, A. D. 1927.

Seal.

M. J. Moore,
Acting Commissioner of Patents.